(12) United States Patent
Donais

(10) Patent No.: US 6,505,598 B1
(45) Date of Patent: Jan. 14, 2003

(54) CONNECTING ROD ASSEMBLY FOR INTERNAL COMBUSTION ENGINE

(75) Inventor: Leonard Donais, Windsor (CA)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/063,761

(22) Filed: May 10, 2002

(51) Int. Cl.⁷ .................................................. F16J 1/14
(52) U.S. Cl. .................................................. 123/197.4
(58) Field of Search ........................... 123/197.4, 197.3

(56) References Cited

U.S. PATENT DOCUMENTS

| | | |
|---|---|---|
| 4,198,879 A | 4/1980 | Hornak et al. |
| 5,243,878 A | 9/1993 | Santi |
| 5,524,507 A | 6/1996 | Olmr et al. |
| 5,799,565 A | 9/1998 | Bo |
| 6,276,233 B1 | 8/2001 | Bolyard |
| 6,282,983 B1 * | 9/2001 | Evans ..................... 123/197.3 |
| 6,408,813 B1 * | 6/2002 | Wilksch et al. .......... 123/197.3 |

* cited by examiner

*Primary Examiner*—Marguerite McMahon

(57) ABSTRACT

A connecting rod assembly for a reciprocating internal combustion engine includes a beam portion having a first end for receiving wrist pin attached to a piston and a second end for engaging a crankshaft. A cap for maintaining the second end of the beam portion in contact with the crankshaft is connected with fasteners which extend through bores formed in the cap and into the second end of the beam portion. The bores into which the fasteners extend have central axes which are not normal to the parting plane defined by the joint between the cap and the second end of the connecting rod beam portion, with the result that the connecting rod cap may be installed upon the beam portion of the connecting rod in only one orientation.

11 Claims, 2 Drawing Sheets

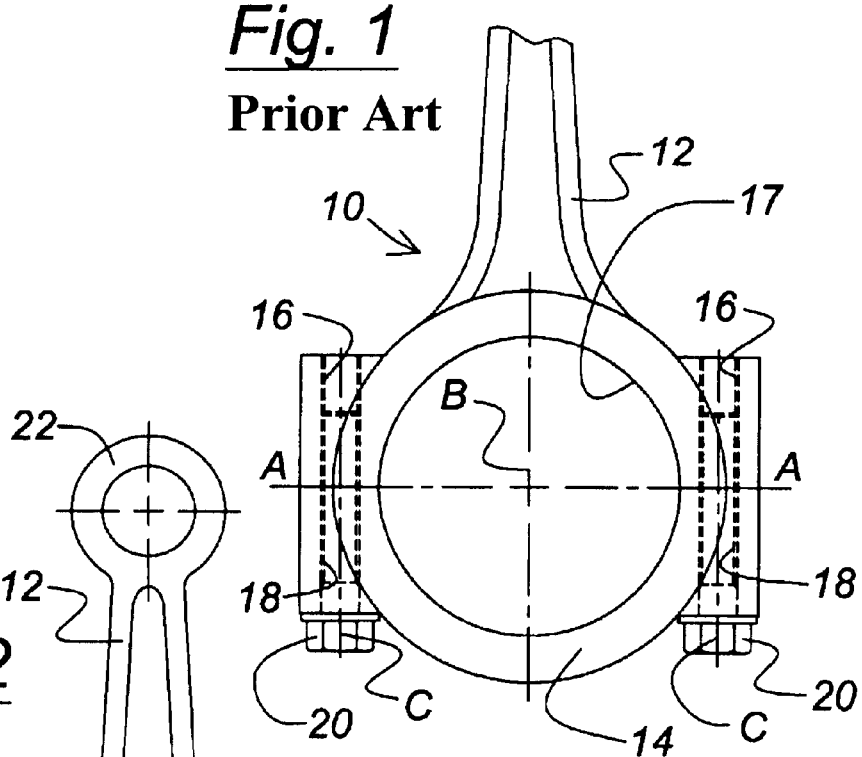
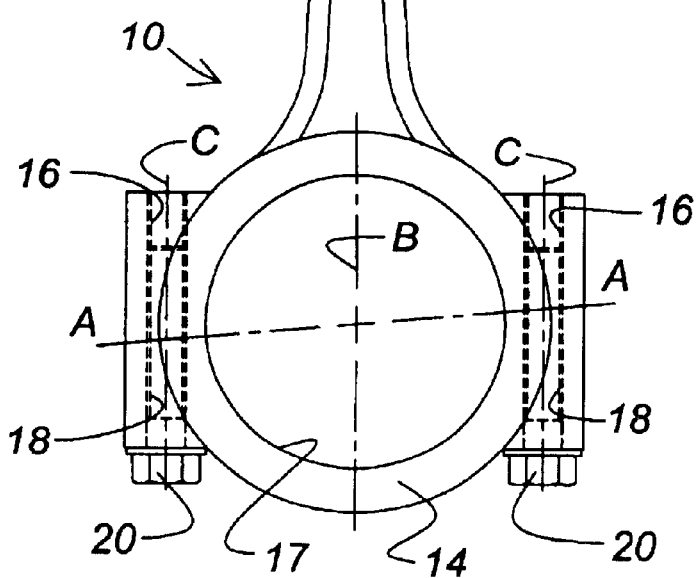

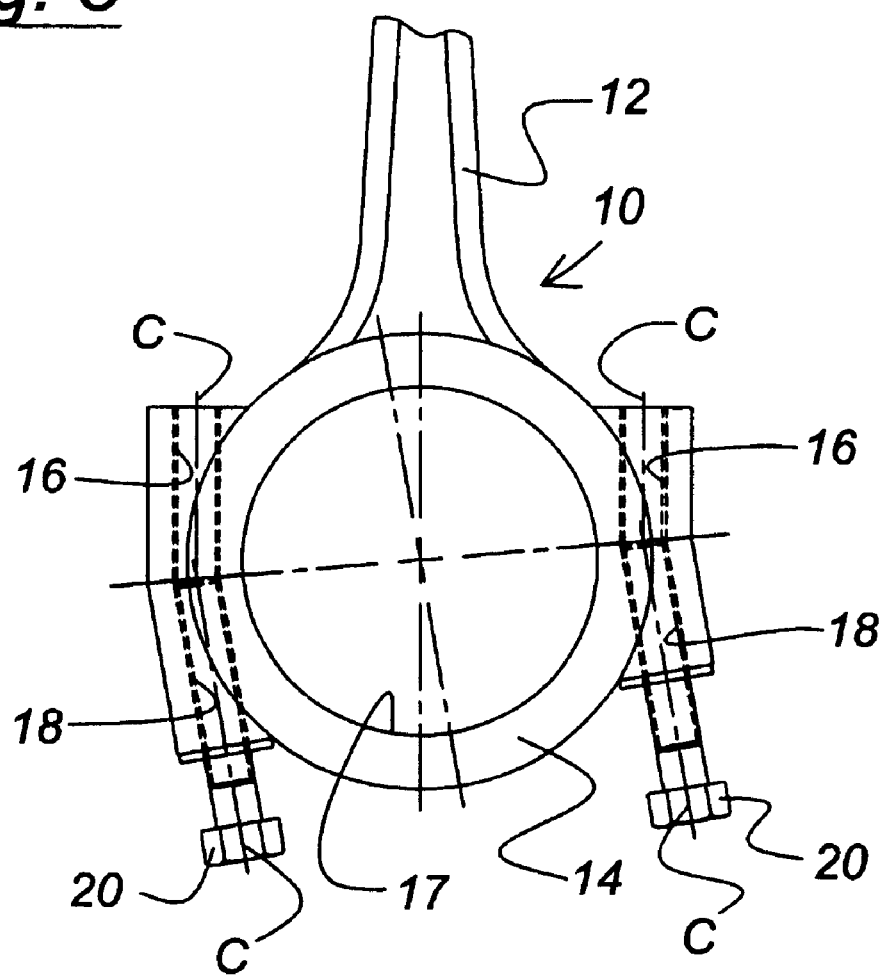

CONNECTING ROD ASSEMBLY FOR INTERNAL COMBUSTION ENGINE

BACKGROUND OF INVENTION

1. Field of the Invention

The present invention pertains to a connecting rod assembly for use in an internal combustion engine. This connecting rod is suitable for high volume assembly with automated equipment.

2. Disclosure Information

The connecting rod has an important role in a reciprocating internal combustion engine the attaching of the pistons to the crankshaft. Criticalities exist with respect to connecting rods. A first criticality is that the joint between the connecting rod and crankshaft must be carefully built so as to assure that the engine has a long service life and is quiet in operation. The desire for quietness, as well as fuel economy resulting from appropriately low dynamic friction, has led engine manufacturers to use connecting rods with caps that are formed integrally from the parent metal of the connecting rod and then removed by cracking the cap from the balance of the connecting rod. Techniques for manufacturing such cracked rods, as they are termed in automotive parlance, are beyond the scope of this specification.

A second criticality or problem with cracked rods resides in the fact that connecting rod caps may sometime be easily fit to the beam portion of the connecting rod in either of two orientations. Unfortunately, only one orientation is correct because the micro structure created when the cap is cracked from the beam portion of the connecting rod prevents the cap from being positioned so as to achieve the correct circularity of the connecting rod's crankshaft journal bore. As a result, engine durability and noise considerations may be adversely affected. The fact is that conventional rod cracking techniques frequently result in components in which it is very difficult, without the aid of magnification instruments, to determine the proper orientation of the connecting rod cap with respect to the beam portion of the rod.

A connecting rod according to the present invention prevents the problem of misoriented connecting rod caps by providing a connecting rod structure which will allow the machine screws which extend through the cap to be installed if and only if the cap is in the proper orientation vis-à-vis the beam portion of the connecting rod.

SUMMARY OF INVENTION

A connecting rod assembly for a reciprocating internal combustion engine includes a beam portion having a first end for receiving a wrist pin attached to a piston and a second end for engaging a crankshaft journal. A cap for maintaining the second end of the beam portion in contact with a crankshaft is joined to the second end of the beam portion along a parting plane. At least one fastener maintains the cap in contact with the second end of the beam portion. The fastener is mounted or received within a bore extending through the cap as well as substantially through the second end of the beam portion. The bore through which the fastener extends has a central axis which is not normal or perpendicular to the parting plane extending between the cap and the beam portion of the connecting rod. The beam portion and the cap are preferably manufactured as a unit from which the cap is fractured after the larger, or the bottom end, of the connecting rod has been honed and otherwise finished.

The plurality of fasteners extending through the cap is preferably threadedly engaged with the second end of the beam portion to maintain the cap in contact with the beam portion.

Each of the fasteners used to maintain the cap in contact with the second end of the beam portion has a central axis which is preferably parallel to the central axis of the other fasteners used to mount the cap to the beam portion of the connecting rod. In any event, none of the bores extending through the cap and the beam portion of the connecting rod is perpendicular to the parting plane defined by the intersection of the cap and the second end of the beam portion, with the result that fasteners may be run down into the beam portion of the connecting rod only if the cap is installed in the proper orientation.

It is an advantage of the present invention that a connecting rod made according to this invention will be highly resistant to misbuilding i.e. attachment of the cap in an improper orientation.

It is an advantage of the present invention that use of a connecting rod according to this invention will obviate the need for inspections based on the possibility that a cap may be incorrectly installed upon the beam portion of the connecting rod.

It is a further advantage of the present invention that connecting rods built according to this invention will be easily maintained in the field, because the proper orientation of the cap with respect to the remainder of the rod will be assured.

It is yet another advantage of the present invention that connecting rods build according to this invention will provide an anti-misbuild feature at little, if any, additional manufacturing cost.

Other advantages, as well as features and objects of the present invention will become apparent to the reader of this specification.

BRIEF DESCRIPTION OF DRAWINGS

FIG. 1 illustrates a prior art connecting rod.

FIG. 2 illustrates a connecting rod according to the present invention in its properly assembled configuration.

FIG. 3 illustrates a connecting rod according to the present invention in which the connecting rod cap is not properly orientated, with the result that the cap fasteners cannot be engaged with the beam portion of the connecting rod.

DETAILED DESCRIPTION

FIG. 1 illustrates a prior art connecting rod 10 in which cap 14 is attached to beam portion 12 by means of a plurality of machine screws 20 which pass through smooth bores 18 formed in cap 14 and into threaded engagement with threaded bores 16 which are furnished in beam portion 12. It is noted that that parting plane A—A of FIG. 1, which extends between cap 14 and second end 17 of beam portion 12, is perpendicular to central axis B of beam portion 12 of connecting rod 10. Parting plane A—A is also perpendicular to the central axes C of fastener 20.

In contrast with the situation of FIG. 1, the inventive connective rod shown in FIG. 2 is illustrated as having a smaller first end 22 adapted to receive a wrist pin attached to a piston (not shown). A major difference between the connecting rods shown in FIGS. 1 and 2 resides in the fact that for the rod shown in FIG. 2, the central axes of bores 16 and 18 are not normal to parting plane A—A. As used herein, the term "normal" is intended to have its conventional definition in engineering and mathematics—i.e., perpendicular. Thus, when two lines or planes are said to be normal with each other, they are perpendicular. It is noted also from FIG. 2 that central axes C of fasteners 20 are parallel with central axis B of beam portion 12 of connecting rod 10. This geometrical orientation is not required for practice of the present invention because as long as parting plane A—A is not perpendicular to the central axes C of bores 16 and 18, the inventive result will be achieved.

FIG. 3 illustrates a result according to the present invention. In this case, cap 14 been brought into contact with second end 17 of beam portion 12. The orientation of cap 14 shown in FIG. 3 is, however, incorrect, with the result that the central axes of bores 16 are not aligned with the central axes of bores 18. The result is that fasteners 20 cannot be run down into threaded engagement, or, for that matter, any engagement, with bores 16, and as a result, cap 14 cannot be attached to beam portion 12 of connecting rod 10. Accordingly, a misbuild of an engine will be averted with the inventive connecting rod.

Although the present invention has been described in connection with particular embodiments thereof, it is to be understood that various modifications, alterations and adaptations may be made by those skilled in the art without departing from the spirit and scope of the invention. For example, the present invention may be employed with connecting rods constructed with techniques which predate cracking, such as connecting, rods with fully machined mating surfaces between the cap and the beam portion of the connecting rod. It is intended that the invention be limited only by the appended claims.

What is claimed is:

1. A connecting rod assembly for a reciprocating internal combustion engine, comprising:
    a beam portion having a first end for receiving a wrist pin attached to a piston and a second end for engaging a crankshaft;
    a cap for maintaining the second end of the beam portion in contact with a crankshaft, with said cap and said second end of the beam portion being joined along a parting plane;
    at least one fastener for maintaining the cap in contact with the second end of the beam portion; and
    at least one bore extending through the cap and the second end of the beam portion, for receiving said at least one fastener, with said bore having a central axis which is not normal to said parting plane.

2. A connecting rod assembly according to claim 1, wherein said beam portion and said cap are manufactured as a unit from which the cap is fractured.

3. A connecting rod assembly for a reciprocating internal combustion engine, comprising:
    a beam portion having a central axis, a first end for receiving a wrist pin attached to a piston, and a second end for engaging a crankshaft;
    a cap for maintaining the second end of the beam portion in contact with a crankshaft, with said cap and said second end of the beam portion being joined along a parting plane which is not normal to the central axis of the beam portion;
    a plurality of fasteners extending through the cap and threadedly engaged with the second end of the beam portion, so as to maintain the cap in contact with the second end of the beam portion, and
    a plurality of bores extending through the cap and the second end of the beam portion, for receiving said plurality of fasteners, with each of said bores having a central axis which is not normal to said parting plane.

4. A connecting rod assembly for a reciprocating internal combustion engine according to claim 3, wherein, each of said fasteners has a central axis which is parallel to the central axis of the beam portion of the connecting rod.

5. A connecting rod assembly for a reciprocating internal combustion engine according to claim 3, wherein, each of said fasteners has a central axis which is substantially parallel to the central axes of the other of said fasteners.

6. A connecting rod assembly for a reciprocating internal combustion engine according to claim 3, wherein, said plurality of fasteners may be engaged with the bores formed in the second end of the beam portion only if the cap is installed upon the beam portion in a unique position.

7. A connecting rod assembly according to claim 3, wherein said beam portion and said cap are manufactured as a unit from which the cap is fractured.

8. A connecting rod assembly for a reciprocating internal combustion engine, comprising:
    a beam portion having a first end for receiving a wrist pin attached to a piston, and a second end for engaging a crankshaft;
    a cap for maintaining the second end of the beam portion in contact with a crankshaft, with said cap abutting said second end of said beam portion, so as to define a parting plane extending between the cap and the second end of the beam portion; and
    a plurality of fasteners extending through a plurality of concentric bores formed in the cap and in the second end of the beam portion, with each of the bores having a central axis which is not perpendicular to said parting plane, such that said plurality of fasteners may be engaged with the bores formed in the second end of the beam portion only if the cap is installed upon the beam portion in a unique orientation.

9. A connecting rod assembly according to claim 8, wherein the central axes of the bores extending through the cap and the second end of the beam portion are substantially parallel to each other.

10. A connecting rod assembly according to claim 8, wherein said beam portion and said cap are manufactured initially as a unit which from which the cap is fractured.

11. A connecting rod assembly according to claim 8, wherein said beam portion and said cap are manufactured initially as separate units, with the mating surfaces between the cap and the beam portion being fully machined.

* * * * *